US005242180A

United States Patent [19]

Bergeron

[11] Patent Number: 5,242,180

[45] Date of Patent: Sep. 7, 1993

[54] PRONE STANDER

[76] Inventor: Timothy J. Bergeron, R.D. 1, Box 64, Dolgeville, N.Y. 13329

[21] Appl. No.: 891,253

[22] Filed: Jun. 1, 1992

[51] Int. Cl.[5] ............ B62M 1/14

[52] U.S. Cl. ............ 280/250.1; 280/304.1; 297/153; 297/411.37; 297/464; 297/488; 297/DIG. 10

[58] Field of Search ............ 280/250.1, 304.1; 297/148, 153, 411, 464, 468, 486, 488, DIG. 10

[56] References Cited

U.S. PATENT DOCUMENTS

| | | | |
|---|---|---|---|
| D. 283,211 | 4/1986 | Palmer et al. | D12/133 |
| D. 315,884 | 4/1991 | Baker | D12/128 |
| 2,295,006 | 9/1942 | Philips | 5/82 |
| 4,029,089 | 6/1977 | Mulholland | 128/80 |
| 4,111,445 | 9/1978 | Haibeck | 280/79.3 |
| 4,515,383 | 5/1985 | Minnebraker | 280/250.1 |
| 4,620,714 | 11/1986 | Davis | 280/250.1 |
| 4,623,194 | 11/1986 | Pillot | 297/316 |
| 4,643,481 | 2/1987 | Saloff et al. | 297/DIG. 4 |
| 4,744,578 | 5/1988 | Stearns | 280/250.1 |
| 4,779,881 | 10/1988 | Baker | 280/250.1 |
| 4,809,804 | 3/1989 | Houston et al. | 280/304.1 |
| 4,878,685 | 11/1989 | Bahm | 280/304.1 |
| 4,927,167 | 5/1990 | Davis | 280/250.1 |
| 4,968,050 | 11/1980 | Kendrick et al. | 280/250.1 |

OTHER PUBLICATIONS

"Mulholland Positioning Systems Inc.", Oct. 1989.

*Primary Examiner*—Mitchell J. Hill

*Attorney, Agent, or Firm*—Nixon & Vanderhye

[57] ABSTRACT

A mobile prone stander includes a main frame including a center support and a rear extension pivotally secured to each other for varying the angle of the center support; a pair of main, laterally aligned wheels and at least a third support wheel mounted to the frame assembly; and a plurality of support elements for supporting a person on the main frame assembly in a substantially upright orientation. The plurality of support elements include a pair of foot and knee support subassemblies, a pelvic, back and head support subassembly, and a tray subassembly, each of which is adjustably mounted on the main frame and each of which is provided with additional and independent degrees of adjustability.

27 Claims, 15 Drawing Sheets

PRONE STANDER

BACKGROUND AND SUMMARY OF THE INVENTION

This invention relates to ambulatory devices for physically handicapped persons and, specifically, to a manually driven mobile prone stander for positioning and supporting the physically handicapped person in a substantially vertical or standing position.

Mobile prone standers are generally known in the art and representative examples of these devices may be found in the patent literature. For example, mobile prone standers or similar devices are disclosed in U.S. Pat. Nos. 4,927,167; 4,968,050; 4,779,881; 4,744,578; and 4,620,714. Such devices are for the most part manually driven and include various body supporting members arranged to support a person who is otherwise unable to stand on his/her own, and these devices and the various support components are often constructed with various degrees of adjustability to adapt the device to a particular person.

The known prone stander designs, however, are generally complex constructions which are not "user friendly" in the sense that the various adjustments are often difficult and often unsatisfactory in terms of the degree to which they are able to be adapted to the specific requirements of each individual user, recognizing that the stander may be used by several persons each day. The present invention seeks to alleviate these problems by providing a relatively simple prone stander construction with easily adjustable components which provide maximum flexibility and adjustability. In addition, because of the ease of assembly and disassembly, the prone stander in accordance with this invention is easily adaptable to physical therapy programs which call for a progressive lessening of reliance on specific support components of the stander.

In accordance with an exemplary embodiment of the invention, the prone stander is centered about a main frame and wheel assembly which includes a one-piece generally L-shaped center support and a rear extension which is pivotally secured to the center support. The main wheel assembly includes a pair of large diameter wheels inwardly canted at their upper portions to facilitate grasping and rotating by the user. Smaller diameter casters are mounted to the forward and rearward ends of the rear extension of the main frame assembly, i.e., along the longitudinal axis of the stander.

The center support is preferably of single piece construction, with a forward generally horizontal section integrally joined to an upstanding section by a curved intermediate portion. This center support includes a pair of outwardly facing side channels extending the full length of the member, as well as a center groove which is formed in the bottom and rear surfaces, respectively, of the support. In other words, the groove opens downwardly in the forward section of the center support and rearwardly in the upstanding section of the center support.

The rear extension, which may be a structural metal channel, is formed with an open slot facing downwardly along the length of the lower surface of the extension. This rear extension fits within the center groove of the center support and is pivotally secured to the center support by means of a pin. The pivotal movement of the rear extension relative to the center support is adjustable by means of a spring loaded adjustment mechanism operable via a rotating knob located at the forward end of the forward, generally horizontal section of the center support. Since the body supporting components are secured to the center support, adjustment of the center support permits the user to be secured within the stander at different angles of inclination relative to vertical, as explained further below.

This main frame assembly as described above provides for the support stability and mobility of the entire prone stander unit.

More specifically, the various body support members are secured to the upstanding section of the center support. For example, combined foot and knee support assemblies are adjustably secured within the side channels of the center support. Not only are the combined foot and knee support assemblies movable up and down within the side channels of the center support, but the foot support elements are also independently adjustable. Cushioned knee pads are also provided which are virtually infinitely independent of the position of the subassemblies relative to the center support.

A pelvic, back and head support subassembly is also adjustably mounted on the center support of the main frame assembly. Here again, the pelvic, back and head support components are not only adjustable relative to the center support, but each of the back and head supports also have cushioned pads which are themselves independently adjustably mounted on the subassembly.

A chest and chin support subassembly is provided and similarly mounted for adjustable movement along the upstanding section of the center support. Again, cushioned pads are provided which are adjustable independently of the center support mounting arrangement.

A tray subassembly is provided which includes forearm and elbow supports. The tray subassembly is easily assembled and disassembled from the center support of the prone stander unit, and is also virtually infinitely adjustable within a horizontal plane. The forearm and elbow supports are mounted within the planar tray element and are themselves independently adjustable in any direction within the horizontal plane of the tray.

Another feature of the invention is the provision for a pouch or bag for carrying the user's personal belongings or other contents which may be easily fastened to the prone stander.

The entire prone stander unit of this invention is designed for quick and easy assembly and disassembly, and for quick and easy adjustment of all body support components in order to adapt the stander to a particular user. This is particularly important since each user of the unit has their own requirements as to size, body orientation and the like, and each may have different therapy programs which require certain adjustments, additions or omissions of the various components.

It should further be noted that the stander as described herein will accommodate users of various sizes, although it is preferably to have both a child's version and an adult version to insure a full range of applicability to all physically handicapped persons requiring the use of such units.

Thus, in accordance with a first exemplary embodiment of the invention, there is provided a prone stander frame assembly comprising a main frame subassembly including:

a) a generally L-shaped frame member having a forwardly extending base portion and an upstanding portion;

b) a frame extension member pivotally secured to the forwardly extending base portion of the generally L-shaped frame member and extending rearwardly thereof;

c) a main wheel assembly including a pair of relatively large diameter wheels secured to the upstanding portion on either side thereof; and d) relatively small diameter support wheels mounted in axially aligned relationship on said frame extension member forwardly and rearwardly of the main wheel assembly.

In another aspect, the invention relates to a prone stander comprising a main frame assembly; a pair of main, laterally aligned wheels and at least a third support wheel mounted to the frame assembly; and a plurality of support elements for supporting a person on the main frame assembly in a substantially upright orientation, the plurality of support elements including a pair of foot support plates each of which is pivotally secured to a support member adjustably mounted on the main frame assembly, each foot support plate having separately adjustable toe and heel supports removably secured thereto.

In still another aspect, the invention relates to a prone stander comprising a main frame assembly; a pair of main, laterally aligned wheels and at least a third support wheel mounted to the frame assembly; and a plurality of support elements for supporting a person on the main frame assembly in a substantially upright orientation, the plurality of support elements including a pair of knee supports secured to the main frame assembly, each said knee support comprising a right angle bracket having two perpendicularly oriented plates, interior surfaces of which are provided with hook and loop fastener material, and a substantially kidney-shaped pad having complementary hook and loop fastener material on a back side of the pad, such that the pad is adjustably securable to the plates.

In still another aspect, the invention provides a prone stander comprising a main frame assembly; a pair of main, laterally aligned wheels and at least a third support wheel mounted to the frame assembly along a longitudinal axis of the main frame assembly; and a plurality of support elements for supporting a person on the main frame assembly in a substantially upright orientation, the plurality of support elements including a pelvic support assembly slidably mounted on a substantially upright member of the main frame assembly, the pelvic support assembly projecting rearwardly of the upright member and including a vertical extension mounted for movement toward and away from the upright member.

In still another aspect, the invention provides a tray assembly for a prone stander, the tray assembly comprising a supporting frame adjusted for mounting on the prone stander, the supporting frame having first fastener elements thereon; a substantially planar tray element having upper and lower surfaces, the lower surface having second fastener elements thereon which are complementary to the first fastener elements for mounting the tray element to the supporting frame in a substantially horizontal orientation; and a pair of forearm and elbow supports adjustably secured to the tray element for movement in any horizontal direction within the plane of the tray element.

DETAILED DESCRIPTION OF THE DRAWINGS

The Main Frame and Wheel Subassembly

Figure 1:
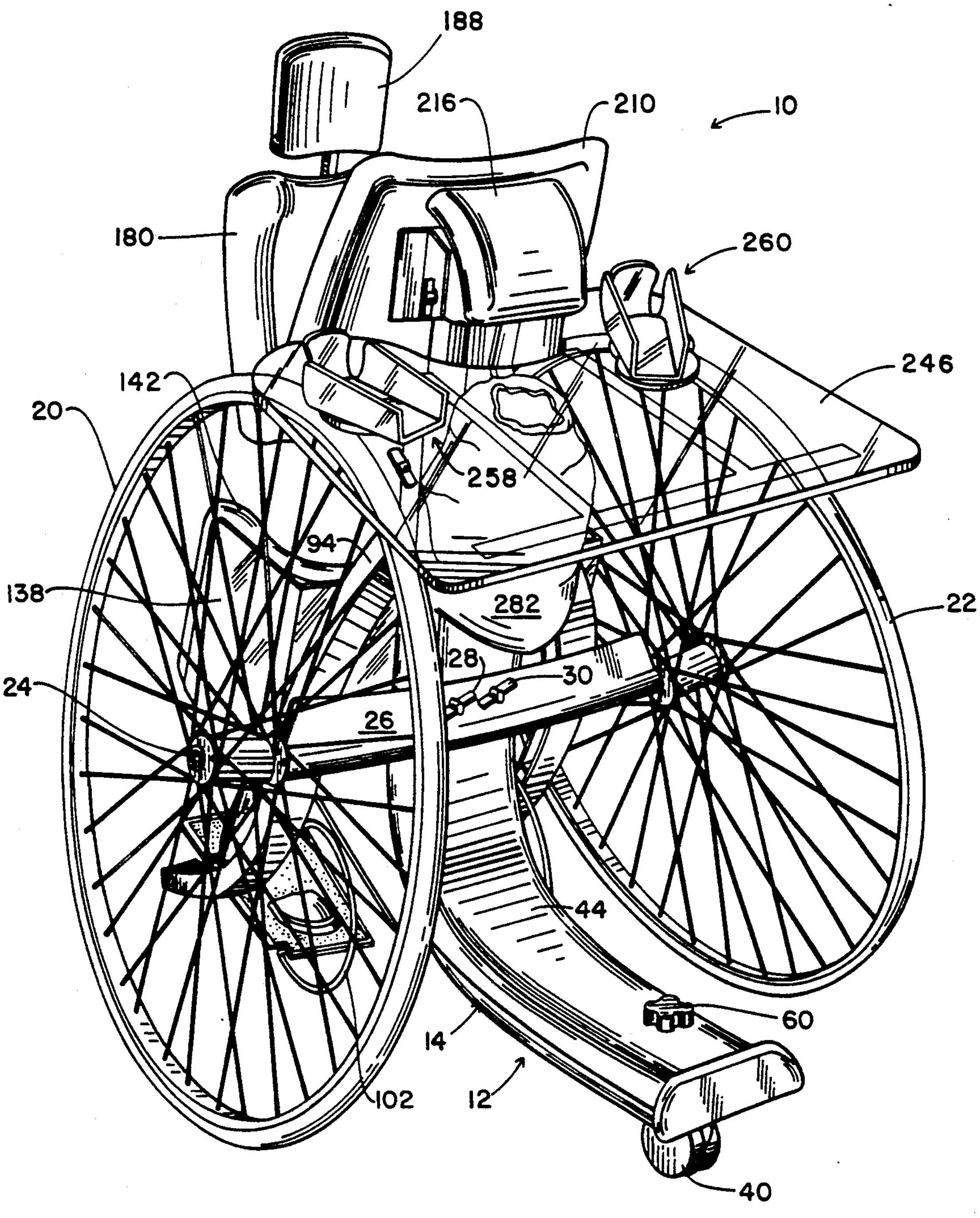
FIG. 1 is a perspective view of a prone stander in accordance with an exemplary embodiment of the invention.
Figure 2:
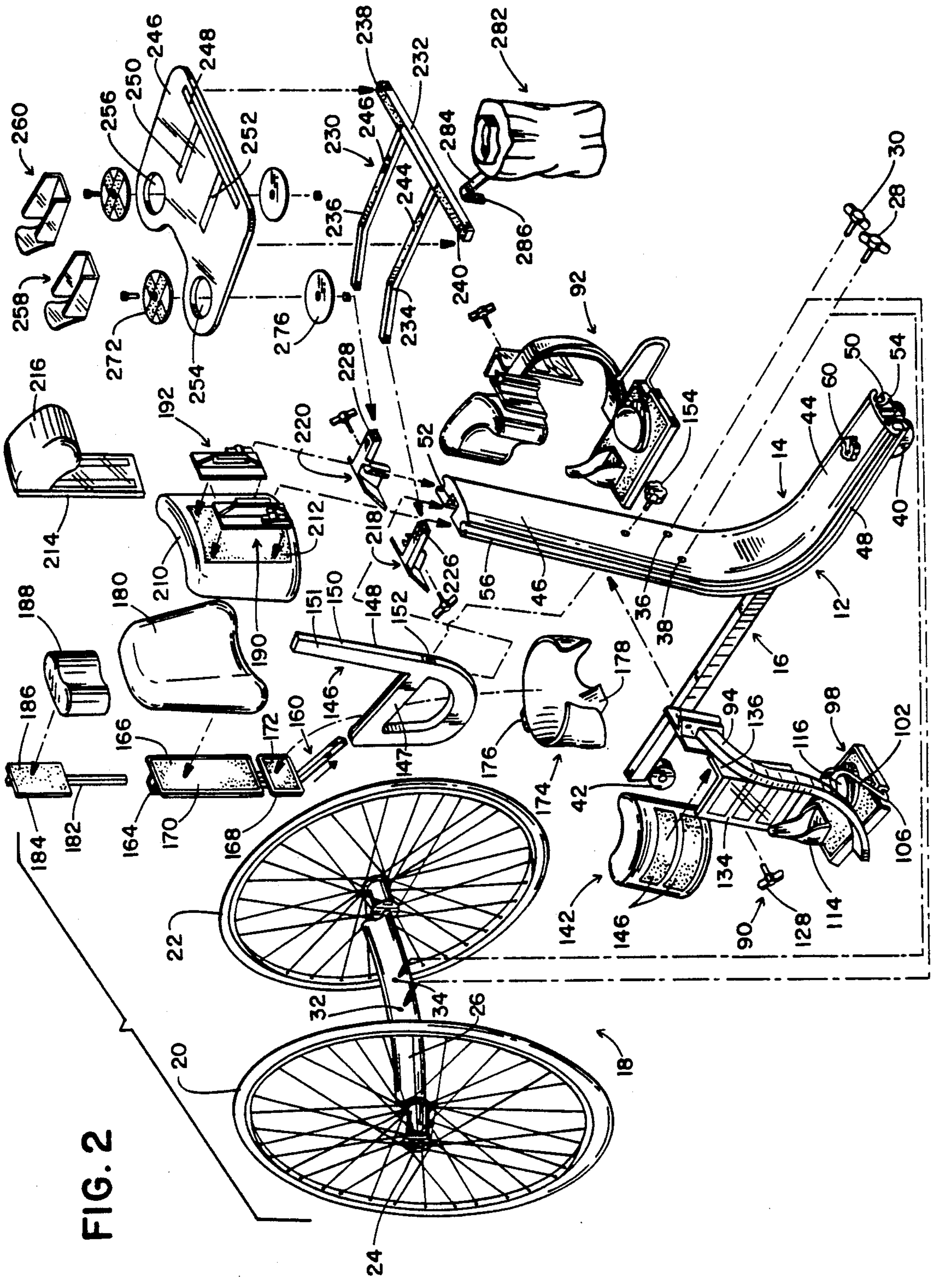
FIG. 2 is an exploded view of the prone stander illustrated in FIG. 1.
Figure 3:
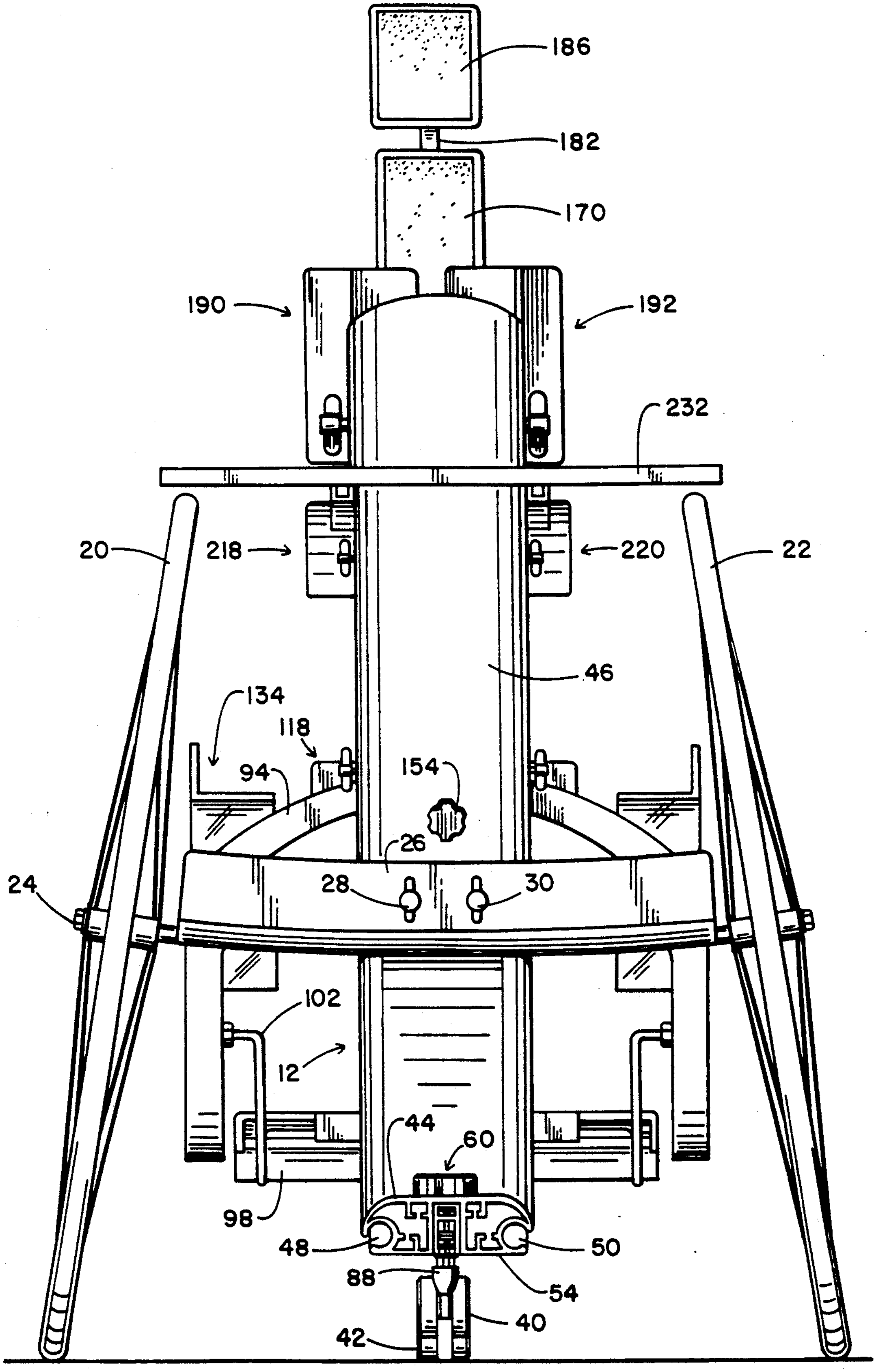
FIG. 3 is a front view of the prone stander illustrated in FIG. 1 with various support pads or cushions removed for the sake of clarity.

With reference primarily to FIGS. 1-3, the prone stander 10 in accordance with this invention has a main frame assembly 12 which generally includes a center support 14 and a rear extension 16 pivotally secured thereto as described below. A main wheel subassembly 18 including large diameter main wheels 20, 22, an axle 24 and an axle housing 26 is secured to the center support 14 by means of wing bolts 28, 30 extending through holes 32, 34 in axle housing 26 and into holes 36, 38 in the center support 14 behind which flat nuts (not shown) are secured. Axle 24 extends from one wheel 20 to the other 22, press fit within the transversely curved axle housing 26. The curvature imparted to the axle itself causes the inward canting of the upper portions of the wheels 20, 22 as best seen in FIG. 3. This arrangement places the wheels in close proximity to the user, thereby facilitating manual driving and steering of the stander. Smaller diameter casters 40, 42 are mounted in a conventional manner to the forward and rearward ends of the rear extension 16.

Figure 7:
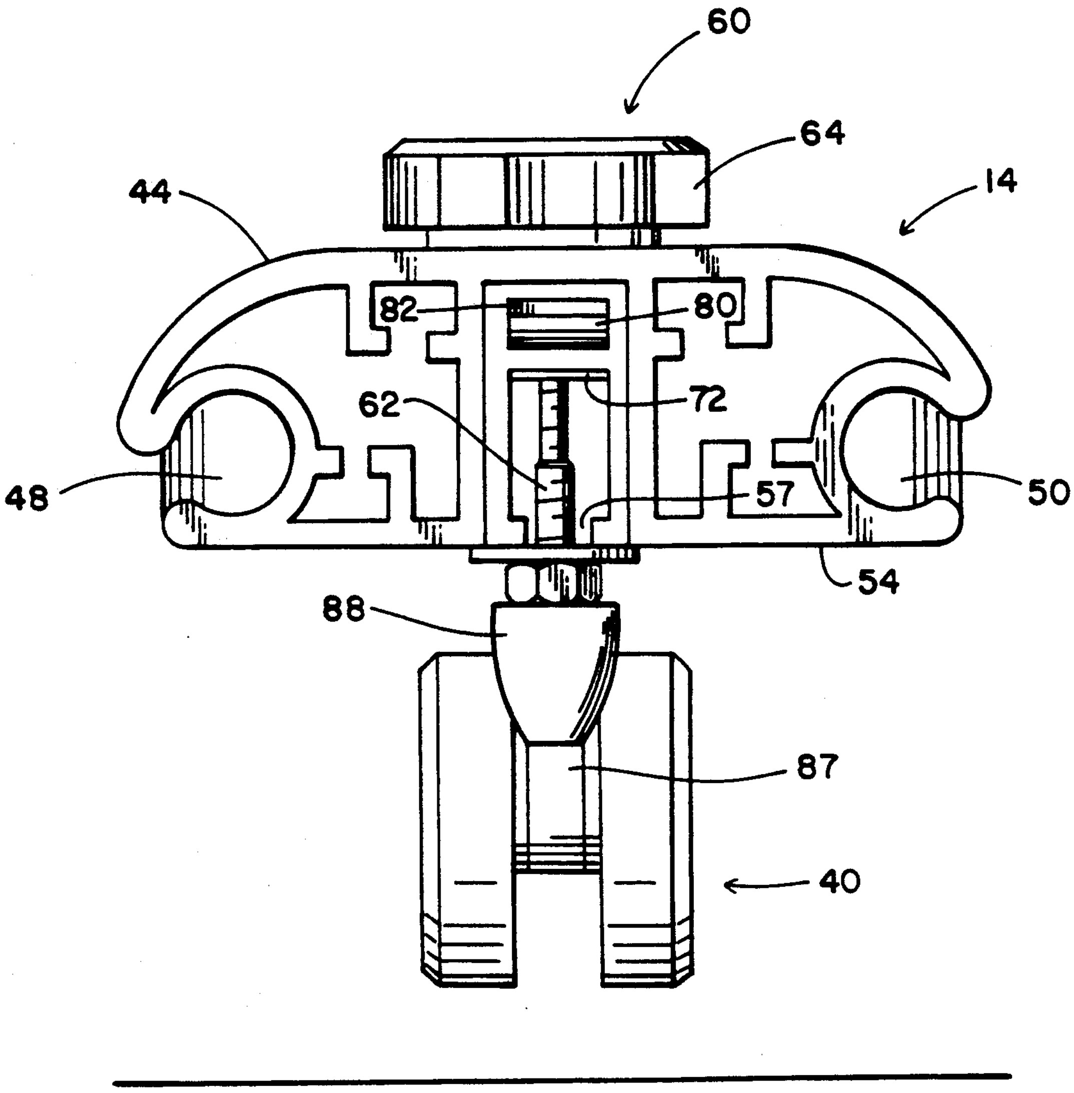
FIG. 7 is a partial front end view of the main frame assembly as illustrated in FIG. 4.
Figure 8:
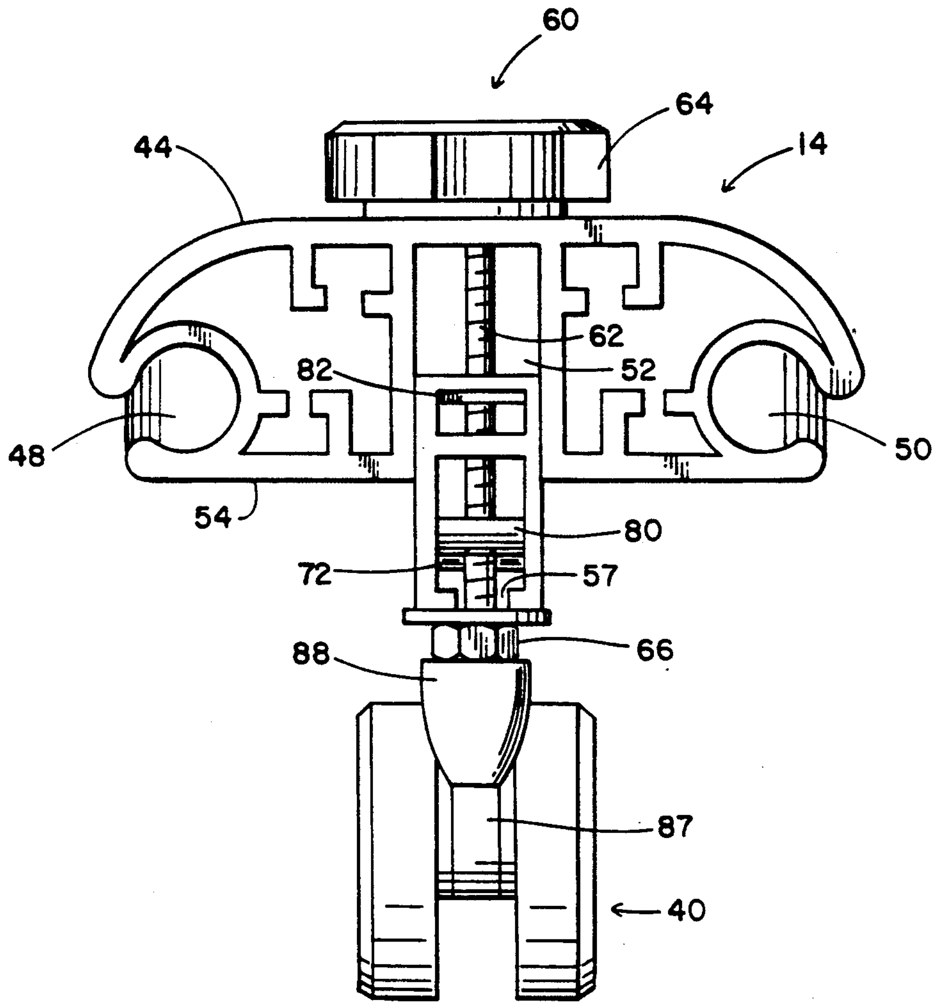
FIG. 8 is a partial front view of the main frame assembly as illustrated in FIG. 6.

The center support 14 comprises a single-piece extrusion (preferably aluminum) which is formed in a stylized L-shape, with a forward, generally horizontal section 44 integrally joined along a curved portion to an upstanding section 46. As best seen in FIGS. 2, 7 and 8, the center support 14 is extruded to include a pair of outwardly facing side channels 48, 50 and a center groove 52 (along with various internal reinforcements) which is formed in the bottom and rear surfaces 54, 56, respectively, of the center support 14, i.e., the groove 52 opens downwardly in forward section 44 and rearwardly in the upstanding section 46.

The rear extension 16 comprises a structural metal channel (steel or aluminum preferred) of generally rectangular cross-section, with an open slot 57 (see especially FIGS. 7 and 8) along the length of the lower surface. The rear extension 16 fits within the center groove 52 of center support 14, extending to a location proximate the forward edge of the horizontal section 44 (see FIGS. 4–6), and it will be appreciated that the depth of groove 52 is substantially equal to the height dimension of the rear extension 16.

The rear extension 16 is pivotally secured to the center support by means of pin 58 located forward of and below the axle 24 (see FIGS. 4–6, 9 and 10). The pivotal movement of extension 16 relative to center support 14 (or vice versa) is limited by the groove 52 as well as by an adjustment mechanism, both of which are described below.

Figure 4:
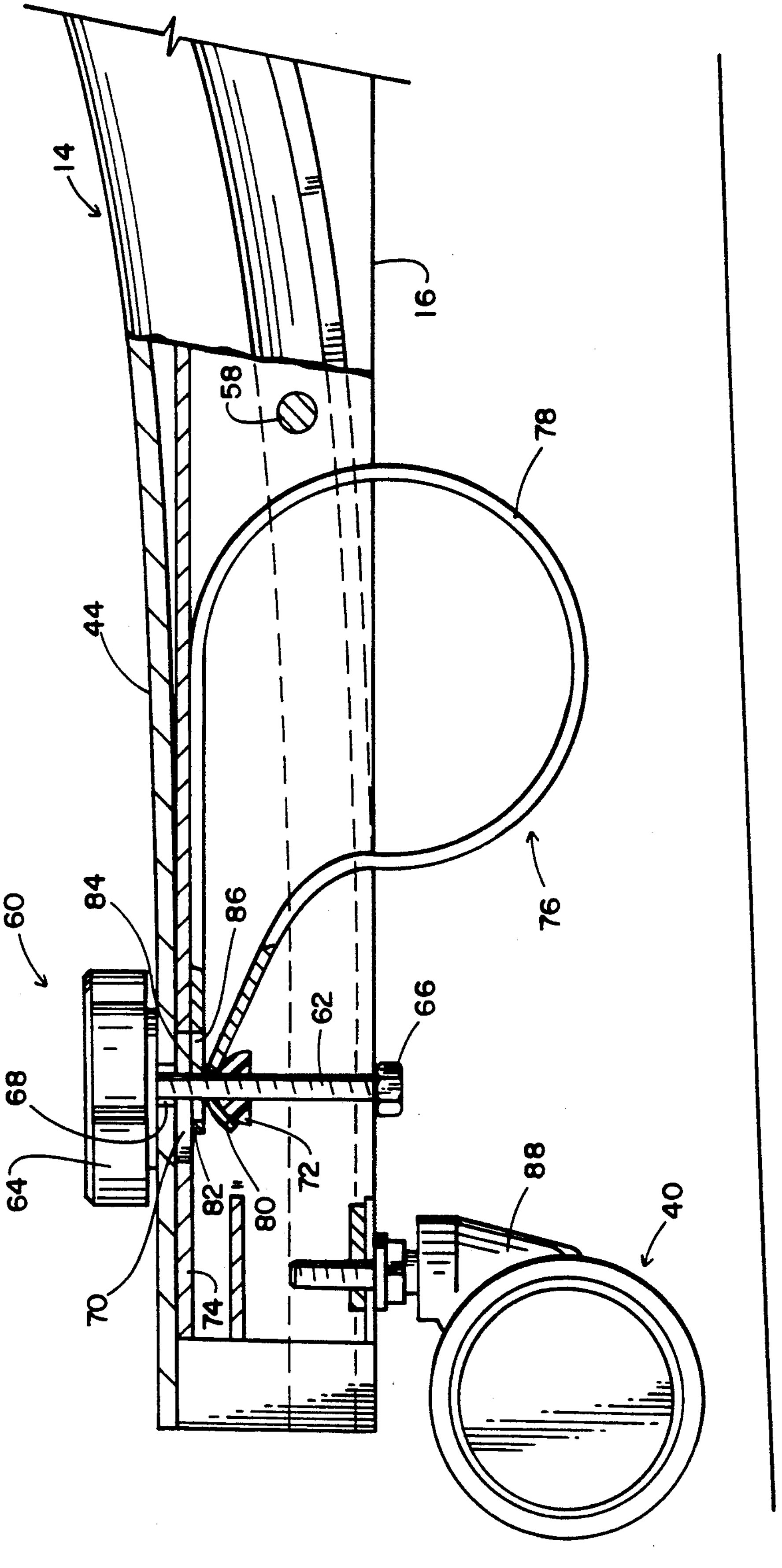
FIG. 4 is a partial side sectional view of the main frame assembly of the prone stander illustrated in FIG. 1.

With specific reference to FIGS. 2–8, an adjusting bolt 60 includes a threaded shank 62, with a knob 64 fixed to one end and a nut 66 welded (or otherwise secured) to the other end. The shank 62 extends through a hole 68 in the horizontal section 44 of center support 14 and through an underlying slot 70 in the upper surface of rear extension 16 and into the slot 57. As best seen in FIG. 4, the shank 62 has a length such that, with the extension 16 fully nested within groove 52, the nut 66 projects from the bottom surfaces of both the center support 14 and rear extension 16. A flat nut 72 (preferably nylon) is threaded onto the shank 62 (prior to installing the nut 66 in place), and because the flat nut 72 has flat side surfaces and a width dimension only slightly smaller than the interior width dimension of the slot 57 in the rear extension 16, rotation of knob 64 will cause the flat nut 72 to move up or down along threaded shank 62, depending on the direction of rotation of the knob.

Interposed between the flat nut 72 and the top wall 74 of the rear extension 16 is a leaf spring 76 which is comprised of an elongated spring steel strip bent to form a loop portion 78, with free ends 80, 82 in substantial vertical (and sometimes overlying) relationship. Ends 80, 82 have a hole 84 and slot 86, respectively, formed therein such that threaded shank 62 may extend therethrough.

Figure 9:
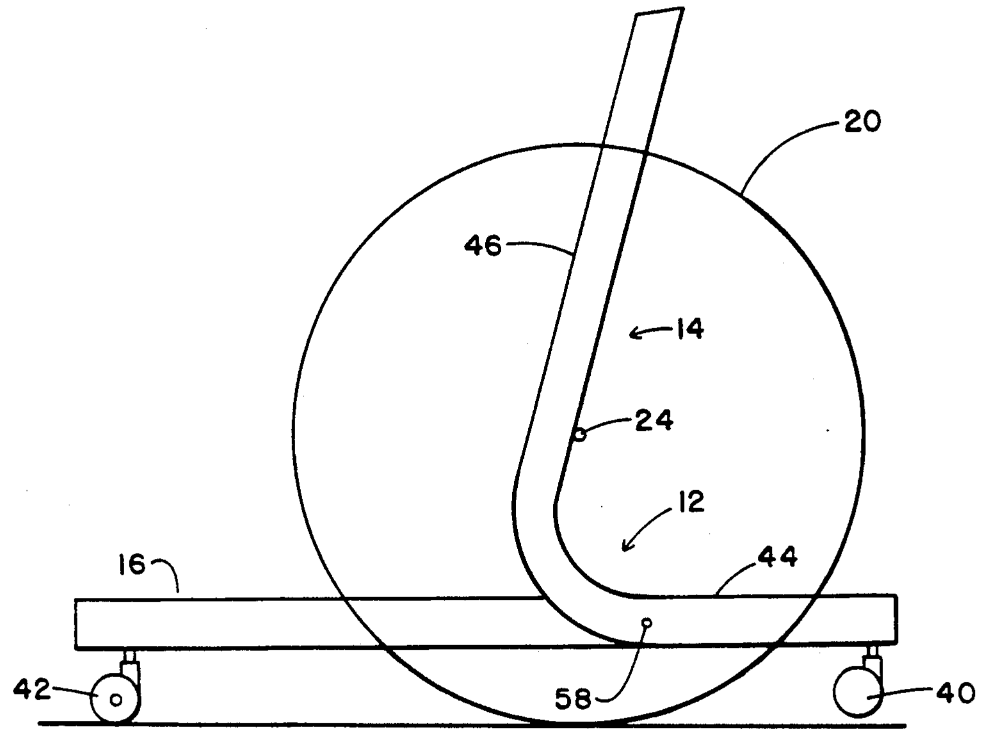
FIGS. 9 and 10 are partial side schematic view of the prone stander unit illustrating the maximum range of adjustment of the center support member as shown in FIGS. 4 and 6, respectively.

As shown in FIGS. 4, 7 and 9, knob 64 has been rotated to draw the flat nut 72 upwardly along the shank 62, against the normal separation force exerted between spring ends 80, 82, to a position where the flat nut 72 locks the extension 16 against the center support 14 so that no pivoting action about pin 58 is possible. Nevertheless, because the casters 40 and 42 are raised slightly with respect to the main wheel assembly 18, and because the center of gravity of the unit as a whole lies to the rear of axle 24, the prone stander will assume a position where the forward caster 40 is raised above ground (by about 5–1.0 inch), supported by the main wheels 20, 22 and rear caster 42 (see FIGS. 4, 7 and 9).

In the position illustrated in FIGS. 4 and 7, it will also be appreciated that center support 14 is in its most inclined position, with the upstanding section 46 extending at about 15° forward of vertical, as also seen in FIG. 9.

Figure 5:
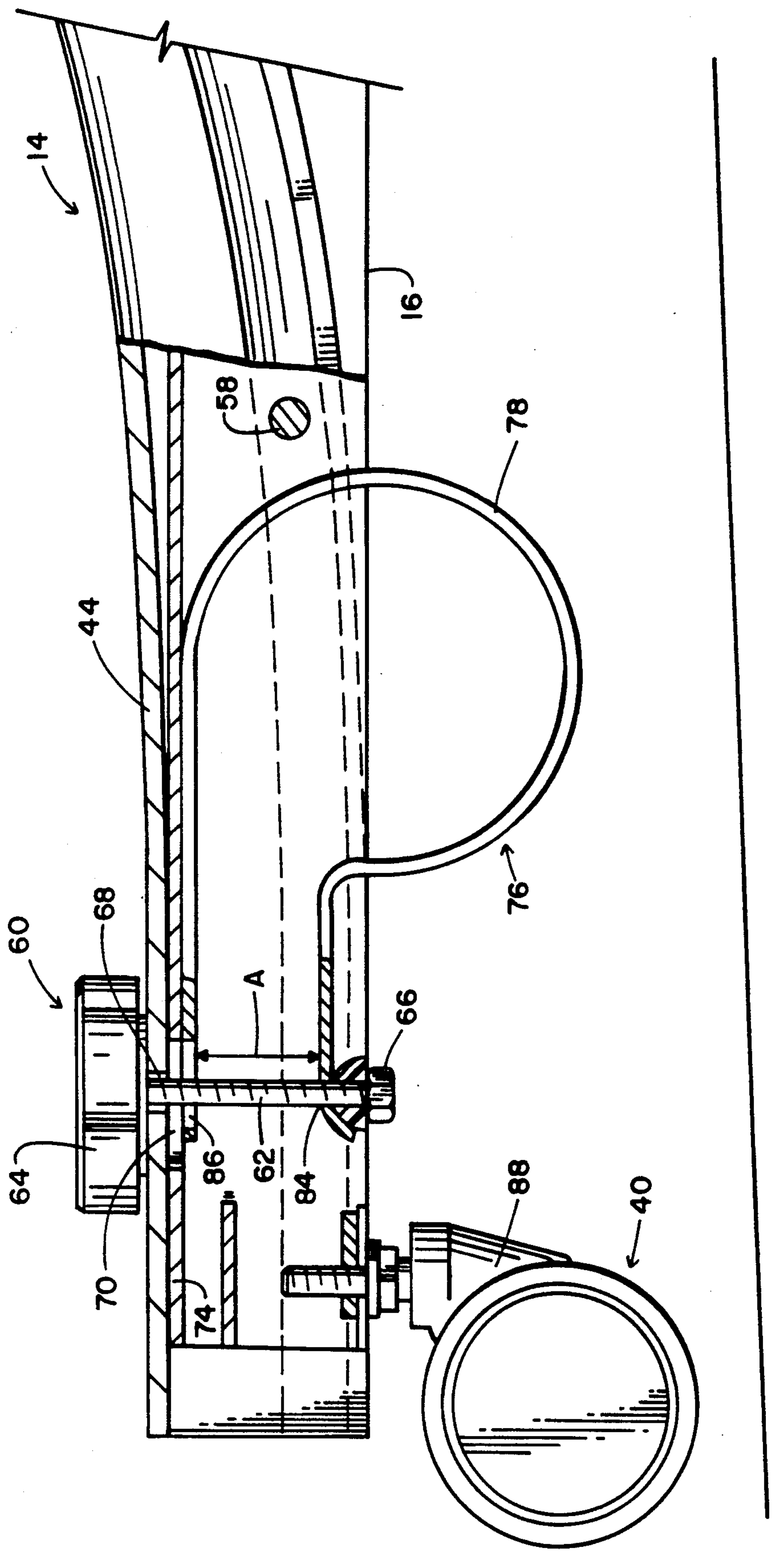
FIG. 5 is a partial side section similar to FIG. 4 but illustrating a maximum range of adjustment between components of the main frame assembly.
Figure 6:
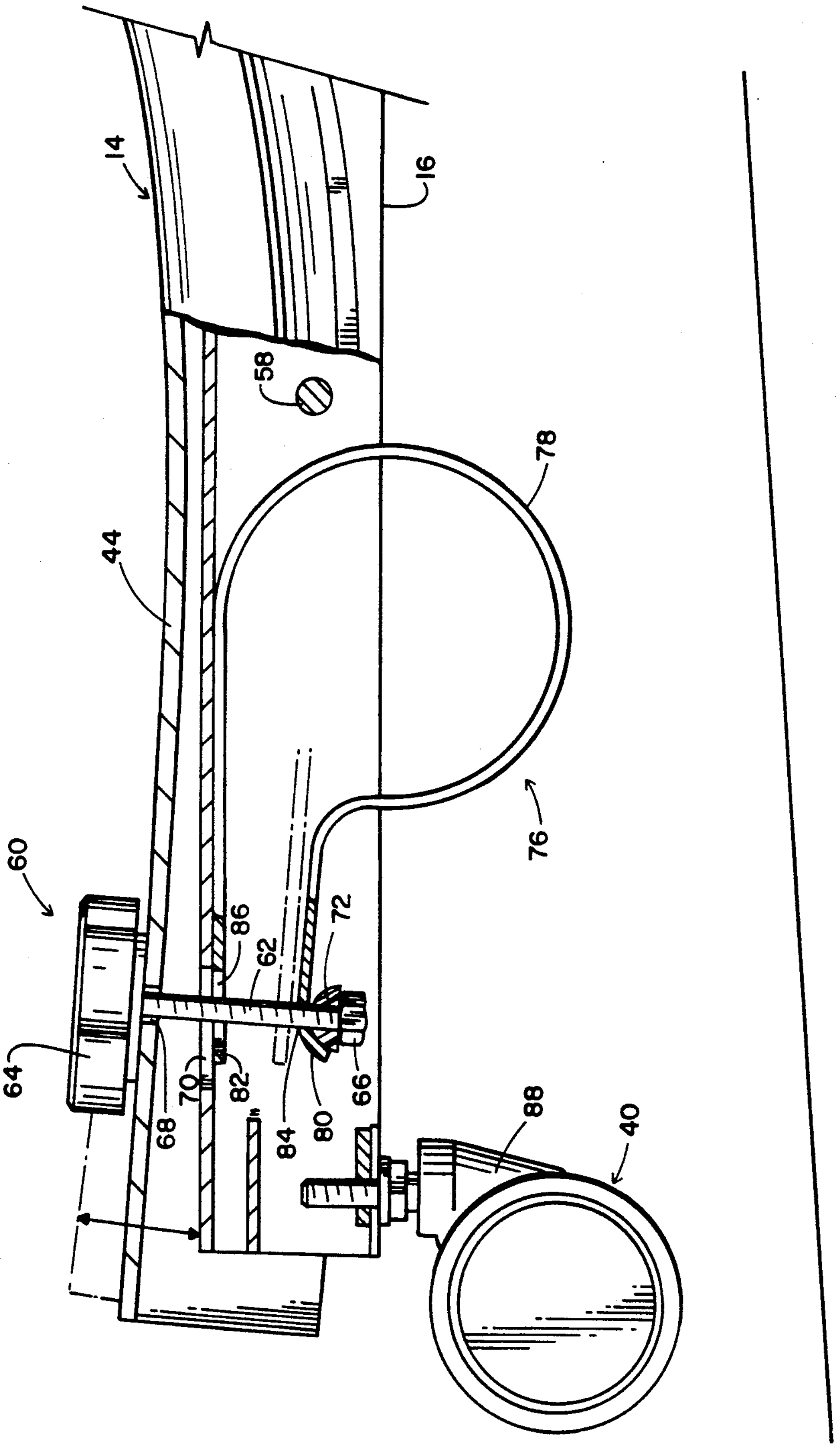
FIG. 6 is a partial side sectional view similar to FIG. 5 but illustrating the center support of the main frame assembly rocked rearwardly to illustrate the adjustable angle of inclination of the center support.

By rotating the knob 64 in the opposite direction, the flat nut 72 will travel downwardly along the shank 62 to the position illustrated in FIG. 5. The latter figure shows the flat nut 72 in its lowermost position on the shank 62 (abutting lock nut 66), thus allowing spring ends 80, 82 to separate and thereby permit maximum relative (and spring biased) movement between the center support 14 and rear extension 16. Specifically, by opening up the space between the flat nut 72 and the top wall 74 of the rear extension 16 (as also defined by dimension A between spring ends 80, 82 in FIG. 5), the center support 16 may be rocked rearwardly about pin 58, as shown in FIGS. 6, 8 and 10, to a position (more clearly shown in FIG. 10), where the upstanding section 46 of center support 14 is substantially vertical, and the forward caster 40 is raised an even grater distance above the ground or floor.

Figure 10:
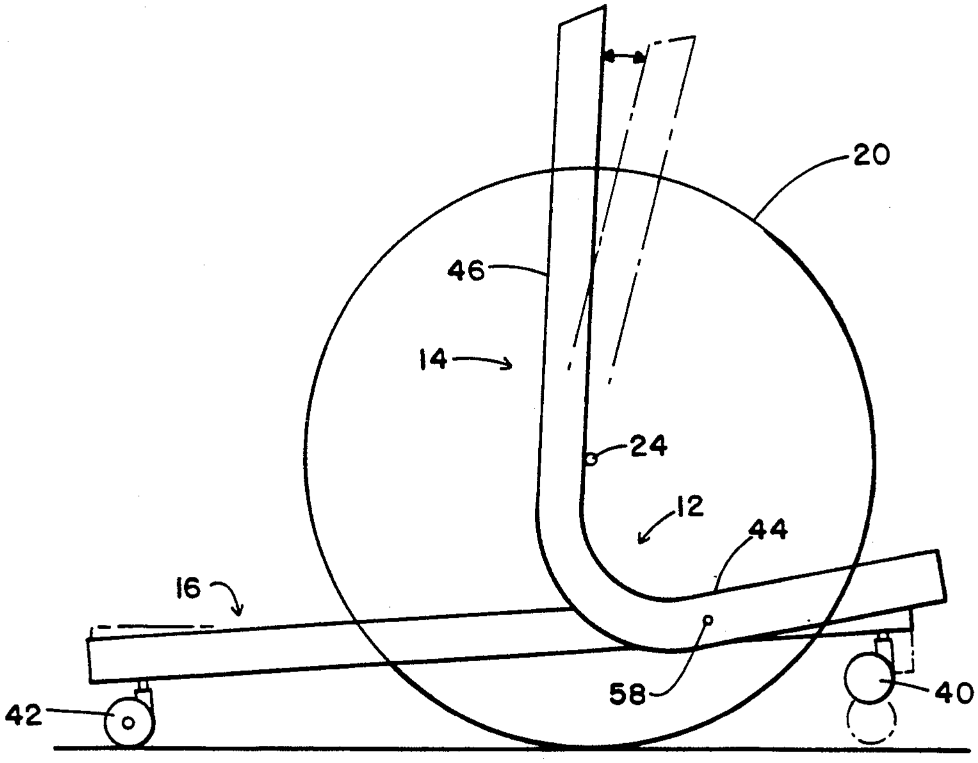

During this rearward tilting or rocking of the center support 16, pivoting motion of the rear extension 16 also occurs about the axle 87 of the rear caster 42, as shown in phantom in FIG. 10. In this regard, casters 40 and 42 are each of the double wheel type, with an axle extending therebetween. A caster housing 88 is fixed to the axle 87 between the wheels, and housing 88 is fixed directly to the rear extension 16. Thus, the extension 16 and housing 88 are free to pivot about the axle 87. This action is best appreciated from FIGS. 8 and 10. These Figures illustrate the maximum relative movement between center support 14 and rear extension 16, and this position will be assumed automatically upon rotation of knob 64 so that flat nut 72 is in the position illustrated in FIG. 6, ahd when a user is in place (so that the weight of the user is behind the pivot pin 58 and axle 24). If there is no weight on the unit rotation of knob 60 will result in separation of the spring ends 80, 82 (FIG. 5), but the change in inclination will not become apparent until a user is supported on the unit, causing the center support to rock towards the rear of the unit.

When necessary, the orientation of the user in space may be varied from upright to about 15° forward to thereby relocate the center of gravity of the user closer to the axle 24. This allows the user to more readily experience fore and aft movement about the axle 24 and thus more realistically experience motion. As the user orientation approaches the 15° forward position, the various pads will provide increased support.

Thus, it will be appreciated that the verticality of the upright section 46 may be easily adjusted as required by rotation of knob 64 between inclined (FIG. 9) and substantially vertical (FIG. 10) positions (a range of about 15°), depending on the particular requirements of the user. It will be further appreciated that, with the main frame and wheel assembly in the position illustrated in FIG. 10, an added benefit is the ease with which the mobile stander may traverse door sills, curbs and the like.

FOOT AND KNEE SUPPORT SUBASSEMBLIES

Figure 11:
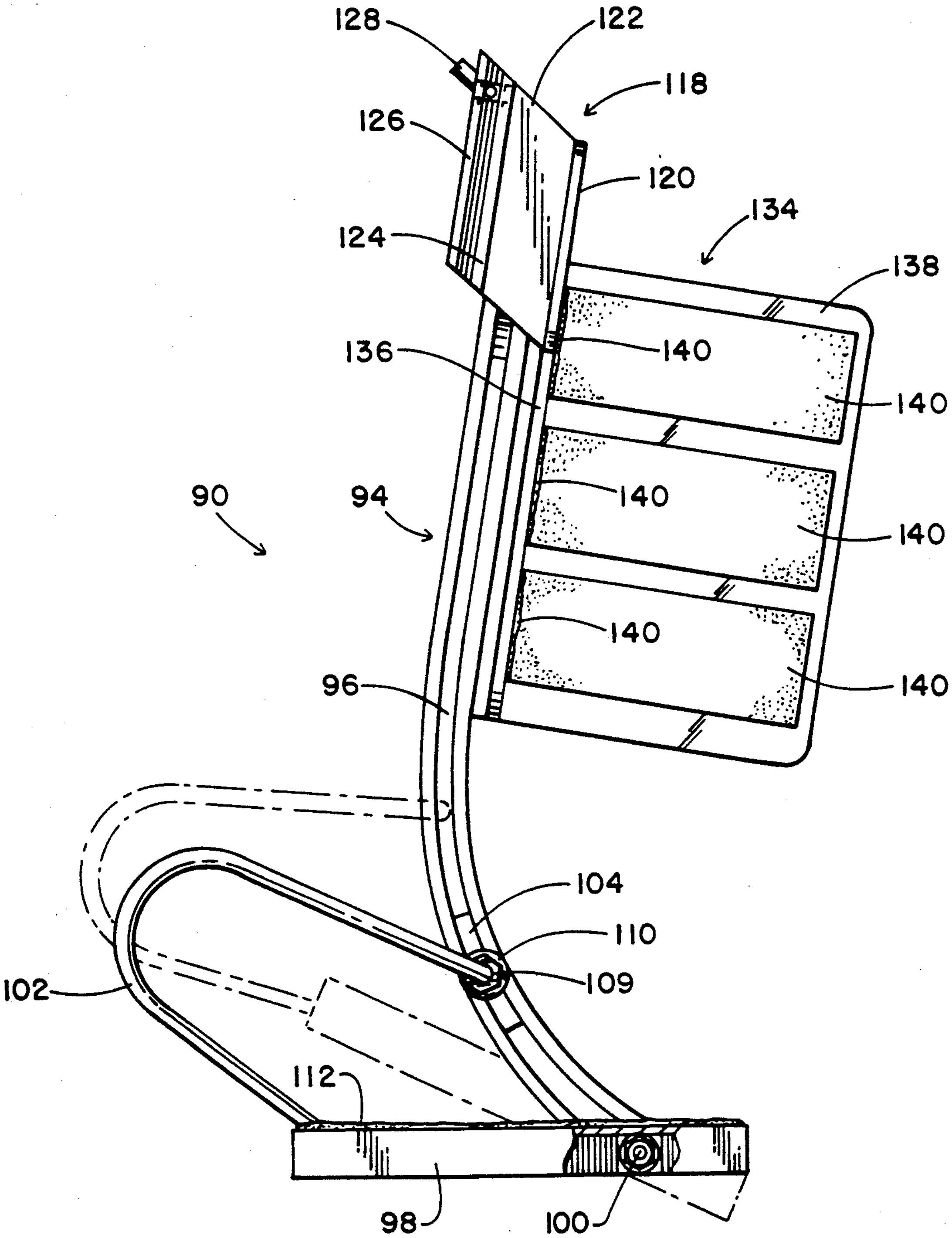
FIG. 11 is a side view of a foot and knee support subassembly for use with the invention.

With reference to FIGS. 2 and 11, foot and knee support assemblies 90, 92 are provided for adjustable mounting within side channels 48, 50, respectively. Since these assemblies are identical (i.e., one being the mirror image of the other), only one need be described in detail.

Referring then to FIG. 11, the assembly 90 is shown which corresponds to a side view of the same assembly in FIG. 3 (looking right to left). The assembly includes a main slide/support member 94 which comprises a compound-curved member (preferably extruded aluminum) which is provided along its inside edge (the edge facing the opposite foot and knee support assembly 92) with a T-shaped groove 96. A foot support pad 98 is pivotally secured to the member 94 adjacent the lower end of member 94 by means of pivot bolt 100. A generally U-shaped link 102 is pivotally secured (by an suitable means) to the forward end of the foot pad and to a slider 104 received in the groove 96. As best seen in FIG. 2, the link 102 is formed with a substantially 90° bend 106 at one end, which is located at a notched forward facing portion 108 of the foot pad 98, and which extends into the foot pad 98 to form the pivot joint therebetween. The other end of link 102 is also bent substantially 90° to extend into the slider 104. This end is threaded to enable a locking nut 109 (and associated washer 110) to be tightened against the member 94, thereby also locking the slider 104 within the groove 96. Upon loosening the nut 109, the slider may be moved within the curved portion of the groove 96 to adjust the angle of inclination of the foot pad 102 between the extremes shown in FIG. 11.

Figure 12:
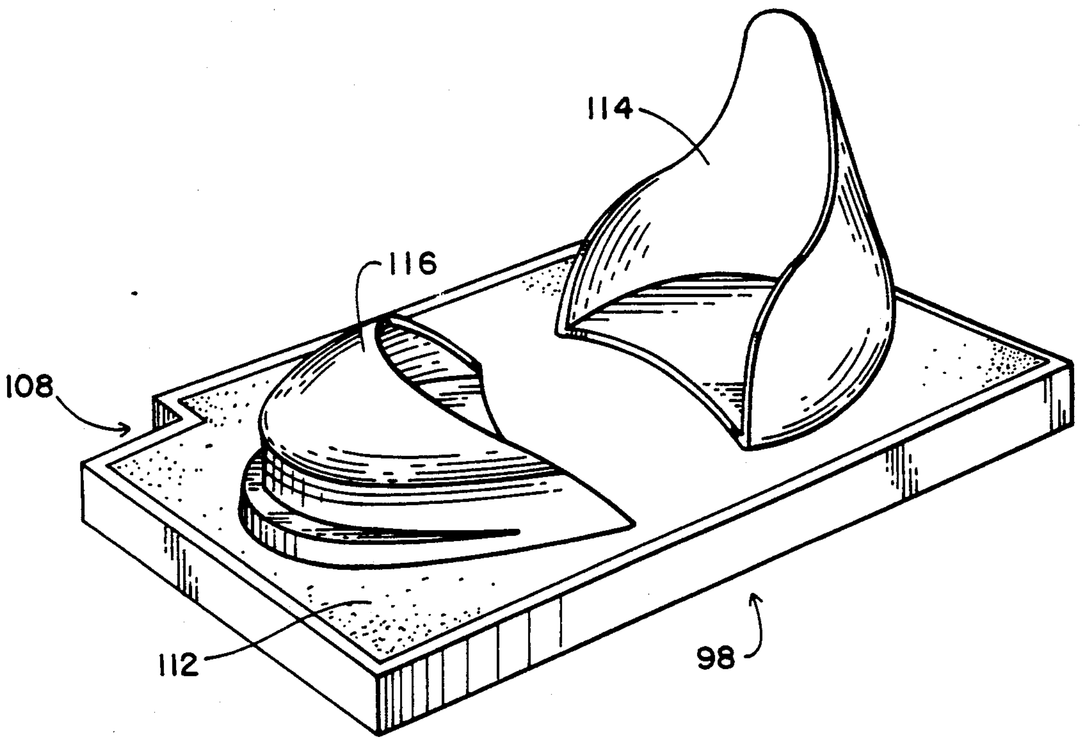
FIG. 12 is a perspective view of toe and heel support elements for use with the foot support.

The foot pad 98 is covered on its upper surface with a hook and loop type fastener material 112, such as Velcro TM, which enables adjustable mounting of a heel piece 114 and toe piece 116 (see FIGS. 2 and 12). By separating the foot engaging/receiving elements 114 and 116 (each of which has complementary fastener material on its underside), virtually infinite adjustments are possible not only with respect to foot size but also with respect to foot angle or inclination relative to a vertical plane.

At the opposite or upper end of the slide/support member 94, there is secured (by welding or other suitable means) a mounting piece 118 (see FIGS. 2, 11 and 13) which includes a rearwardly facing planar portion 120 (which may serve as a mounting surface for an additional pad, such as a thigh pad—not shown) and a forwardly extending web 122 which extends perpendicularly to portion 120, intermediate the right and left hand ends of the latter. At the forward end of web 122, there is formed a pair of curved mounting legs 124, 126 which together form an elongated slide which is shaped to fit within side channel 48. An adjusting bolt including a knob 128 and threaded shank 130 extends through the web 122 and between the legs 124, 126. A nut 132 is captured between the legs 124, 126 and serves to permit the free end of the adjusting bolt to be rotated into contact with the base of channel 48.

It will be appreciated that the legs 124, 126 may be inserted into the side channel 48 from the upper end of the upstanding section 46 of the center support 14, and adjusted within the channel 48 to the desired height. When properly located, rotation of knob 128 in a clockwise direction will thread the shank 130 through the nut 132 and into locking relationship with the base of the side channel 48.

By combining vertical adjustability of the foot and knee support assembly 90 (and 92) along upstanding section 46 of center support 14, with the pivotal adjustability of the foot pad 98 vis-a-vis member 94, virtually unlimited adjustability is provided for adapting the foot and knee assembly to meet the requirements of any particular user.

Figure 13:
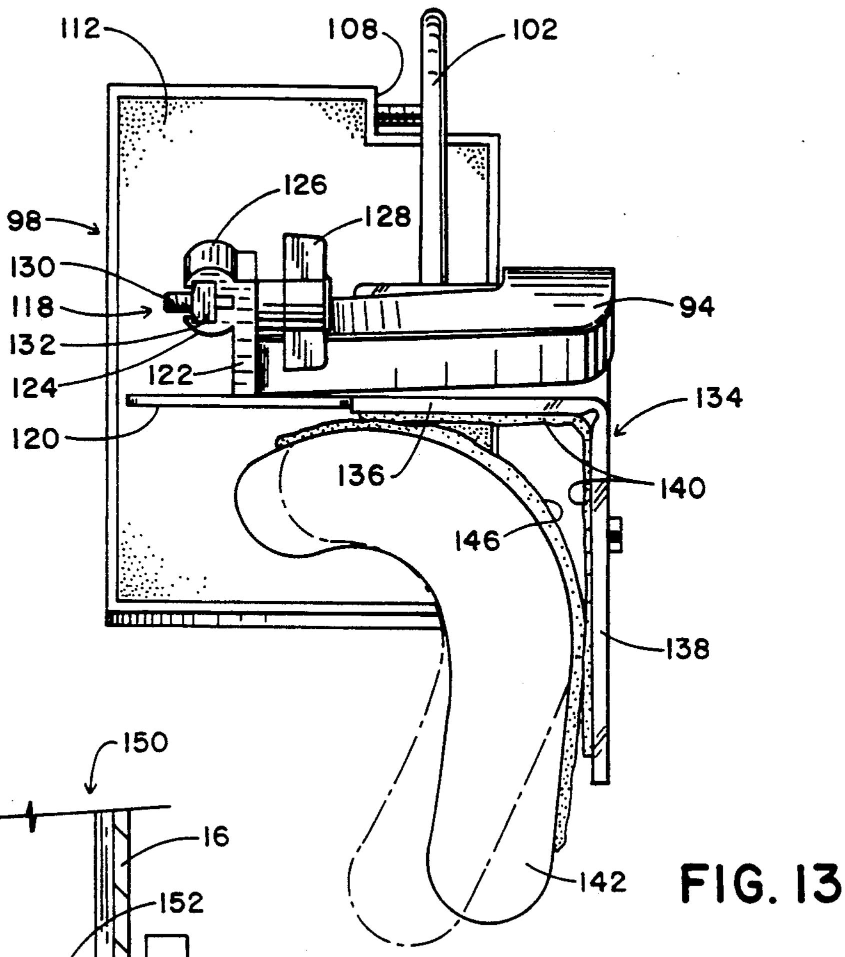
FIG. 13 is a plan view of the foot and knee support assembly of FIG. 11 but with a knee pad added.

The member 94 also mounts a knee support in the form of a fixed right angle brace 134 having transverse and longitudinally oriented sections 136, 138. Both sections are provided with strips 140 of hook and loop type fastener material, such as Velcro TM, as best seen in FIGS. 11 and 13. Curved pads 142, 144 are provided, one for each assembly 90, 92. The pad 142 (and 144), which is generally kidney-shaped, may be fabric covered foam or other cushioning material. The pad 142 is provided on its back side with strips 146 of complementary fastener material which allows the pad 142 to be firmly secured to the right angle brace 134.

Because of the right-angle configuration of brace 134, and the curved shape of the pad 142, it will be appreciated that pad 142 may be mounted to the brace 134 in a variety of positions by rotating the pad, (as shown in phantom in FIG. 13), and/or by raising or lowering the pad relative to the brace 134. Of course, the knee pad is also movable as the entire assembly 90 is adjusted relative to the center support 14. Here again, great flexibility and adjustability are provided not only as to knee height but also knee inclination or rotation inwardly or outwardly relative to normal.

THE PELVIC, BACK AND HEAD SUPPORT SUBASSEMBLY

Figure 16:
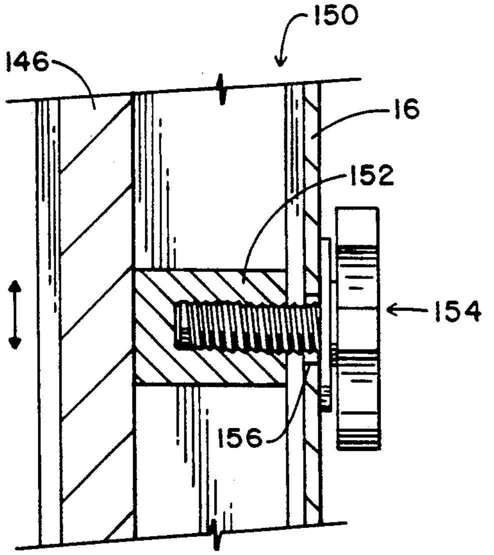
FIG. 16 is an enlarged cut-away detail of an adjustment knob illustrated in FIG. 14.
Figure 14:
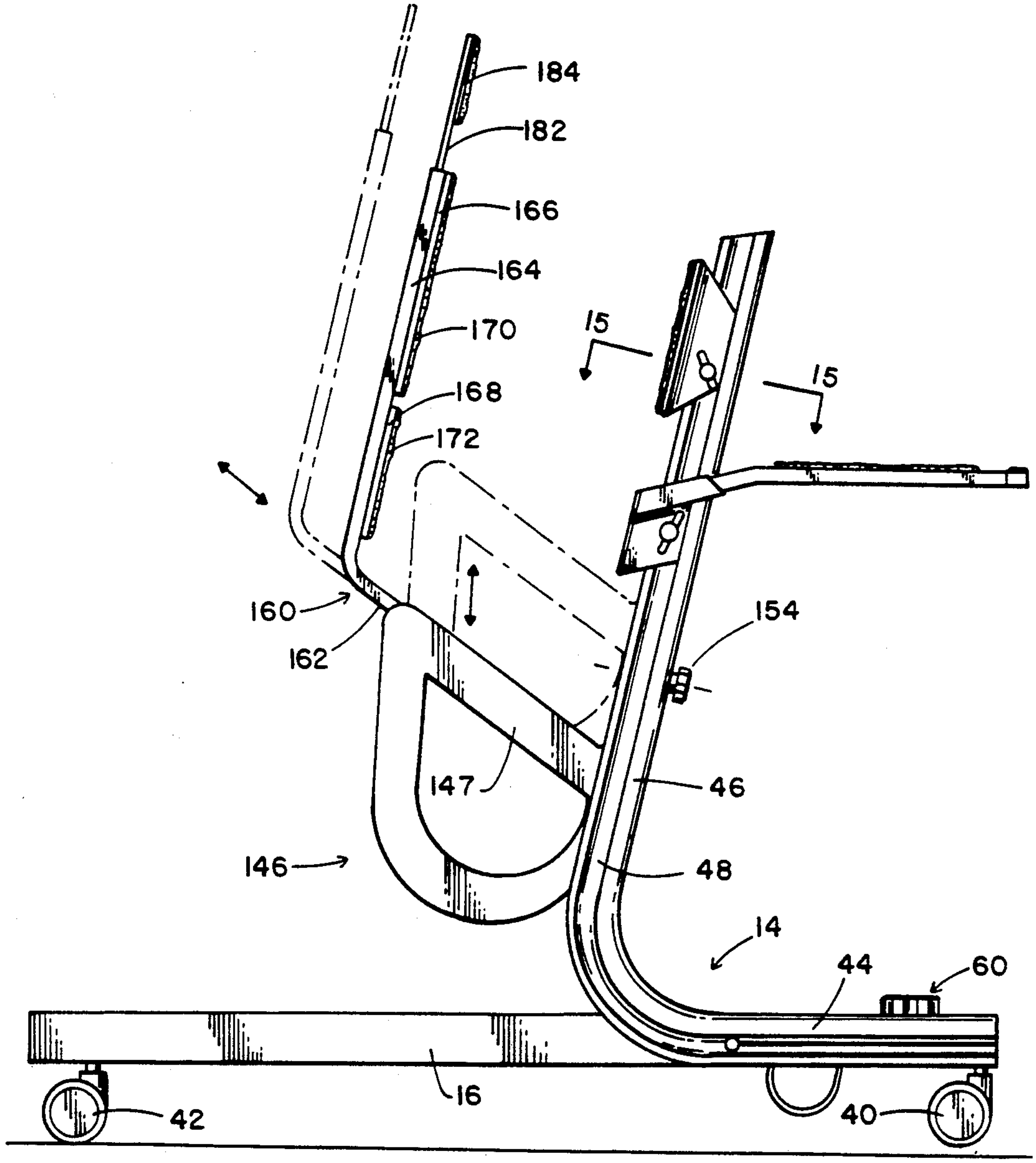
FIG. 14 is a side view of the main frame assembly of the prone stander with various parts removed for clarity, and particularly illustrating the pelvic, back and head subassembly and tray subassembly in accordance with the invention.

This subassembly includes a J-shaped channel member 146 (see FIGS. 2 and 16) formed with a cross brace 147 (both preferably aluminum), a forward facing edge 148 (FIG. 2) of which is formed with an elongated T-shaped groove 150 in which a slider bushing 152 is captured. The bushing 152 is formed with a threaded bore for receiving a locking bolt 154 as explained below. The forward, upstanding portion 151 of the J-shaped channel member 146 is adapted to be received within the groove 52 in the center support 14 as best seen in FIGS. 2 and 14. Thus, the cross-sectional width and depth dimensions of the upstanding portion of J-shaped channel member 146 are such that the latter is snugly but slidably received in the groove 52. As best seen in FIG. 16, the upstanding section 46 of the center support 16 is provided with an aperture 156 through which locking bolt 154 extends, with the knob of the bolt facing forward. The shank of the bolt is threaded into the slider bushing 152. When the bolt 154 is only loosely connected, the J-shaped channel may be moved up and down (as shown in FIG. 14) within groove 52 to the desired height, (slider bushing 152 and bolt 154 remain stationary). If desired, suitable friction reduction means may be installed within groove 52 to facilitate the sliding action of the channel 146. For example, a strip of hook and loop fastener material could be applied to the base of groove 52. The differential coefficient of friction of adjacent material allows the channel 46 to slide smoothly within the groove 52. Upon tightening the bolt 154, the J-shaped channel 146 will be securely locked in place.

The cross brace 147 of J-shaped channel 146 is formed with an upwardly opening T-shaped groove 158 (see FIG. 2) in which an L-shaped channel bracket 160 is slidably received. More specifically, the L-shaped channel bracket 160 includes a base portion 162 and an upstanding portion 164. This is preferably a single U-shaped (in cross section)aluminum extrusion, bent to the L-shape. The base portion 162 may be inserted into the T-shaped groove 158 and adjusted to the desired position, as described further below. The exterior surface of base portion 162 may be coated with friction reducing material such as high density polyethlyene. A thickness of 0.010 inch facilitates sliding but also provides minimal tolerance to prevent undesirable side-to-side or lateral movement of the L-shaped channel bracket 160 relative to the J-shaped channel 146.

The upstanding portion 164 of the L-shaped channel bracket 160 mounts a pair of flat plates 166, 168, the broad surfaces of which extend transverse to the longitudinal direction of the frame assembly 12. Both plates 166, 168 are provided on their forward facing surfaces with hook and loop type fastener material 170, 172, such as Velcro TM.

The smaller, lower plate 168 is located to secure and locate a flexible plastic pelvic support brace 174 (see FIG. 2) provided with complementary fastener material 176. The brace 174 is a belt-like member which restrains the pelvic area of the user against lateral and/or twisting motion. It includes leg openings on either side of a crotch piece 178 which is designed to seat on the brace 147 and/or the base portion 162 of L-shaped channel bracket 160. At the same time, the fastening material 176 on the back side of the pelvic brace 174 adjustably engages the complementary fastening material 172 on plate 168 to further secure the brace 174 in place. It will be appreciated that the brace 174 may be made of rigid material if desired. In any event, brace 174 provides a transitional interface of body weight to the metal cross member 147.

The upper plate 166, and its fastening material 170 is designed to mount a back support pad or cushion 180 (see FIGS. 1 and 2) similar in composition to knee pads 142, 144, which is also provided with hook and loop type fastener material such as Velcro TM, on its back side. Thus, the pad or cushion 180 may be adjusted vertically, laterally, or a combination of both, on the plate 166 to suit particular needs.

It will also be appreciated that plates 166 and 168 can be combined into a single plate. In this event, pad 180 may be extended the full length of the single plate, and may also at least partially envelop the pelvic support 174 to thereby further insure against undesirable rocking movement of the pelvis.

A channel extension 182 provided with another flat plate 184 may be provided for slidable engagement within the upstanding portion 164 of the L-shaped channel bracket 160. Extension 182 may be provided on its exterior surface with Velcro TM-type material to provide infinite adjustment through controlled resistance to movement within the upstanding portion 164. Plate 184 may be provided with hook and loop type fastener material, such as Velcro TM, to enable securement of a head rest 188 (see FIGS. 1 and 2) provided with complementary fastening material (not shown) on its back side.

It will be appreciated from FIG. 2 that the L-shaped channel bracket 160 (and hence the pelvic brace 174, back support 180 and head rest 188) may be slidably adjusted within the T-shaped groove 158, toward and away from the upstanding section 46 of the center support 16 to accommodate users of different size. The L-shaped channel bracket 160 is self-locking within groove 158 when forces are applied in a rearward direction on upstanding portion 166 (or in a downward direction on base 162) since such force will tend to rock the bracket 160 rearwardly, frictionally locking the base 162 within the T-shaped groove 158.

THE CHEST AND CHIN SUPPORT SUBASSEMBLY

Figure 15:
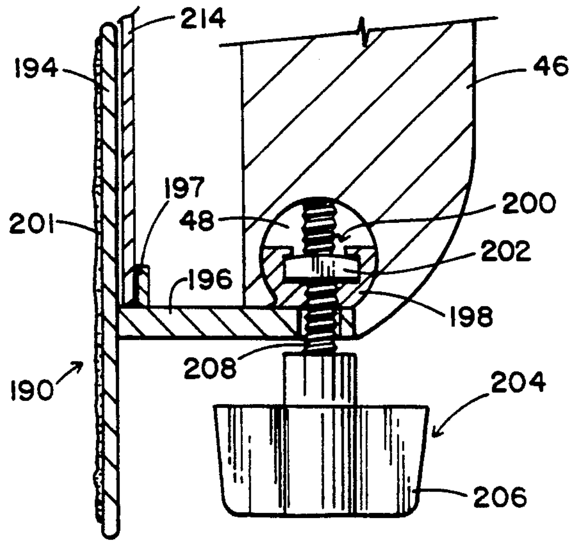
FIG. 15 is a partial side section taken along line 15—15 of FIG. 14.

With specific reference to FIGS. 2 and 15, individual chest support brackets 190, 192 are slidably mountable within the side channels 48, 50 of the center support 14, and specifically the upstanding section 46 thereof. The chest support brackets 190, 192 are identical, so that only one need be described in detail. As best seen in FIG. 15, the chest support bracket 190 includes a flat plate portion 194 which, when mounted, extends transversely of the longitudinal axis of the frame assembly 12. A web portion 196 extends forwardly of the plate 194 and intermediate the side edges thereof. A finger-like projection 197 extends away from the web 196 to create a groove or slot 199 to facilitate mounting a chin support as described below. The distal or free end of the web 196 has a semi-circular projection 198 formed (or separately attached) to one side thereof, the semi-circular section shaped and sized to slide within the side channel 48 of the upstanding section 46 of the center support 14. The semi-circular projection 198 is formed with a T-shaped groove 200 at least at a lower end thereof and adapted to capture a nut 202. A locking bolt 204 is provided and includes a knob 206 and a threaded shank 208. The threaded shank portion 208 is inserted through an aperture at the distal end of the web 196 and threaded into the nut 202 captured within the T-shaped groove 200 within the semi-circular projection 198. It will be appreciated that when the chest support bracket 190 is slidably inserted within the side channel 48, it may be moved up and down within the side channel 48 to a desired location. Upon tightening of the bolt 204 by means of knob 206, the free end of the threaded shank 208 will engage the base of the side channel 48 to thereby lock the chest support bracket 190 in place.

The flat plate portions (194 for bracket 190) each are provided with pads of hook and loop type fastener material 201 (see FIG. 15), such as Velcro TM, on their rearward facing surfaces. A chest support cushion or pad 210 (or similar composition to the back support pad or cushion 180 and knee support pads 142, 144) is likewise provided with a pad or sheet of complementary fastening material 212, enabling the chest support pad or cushion 210 to be firmly secured to the chest support brackets 190, 192. It will be appreciated that the chest support 210 may be adjusted vertically and/or laterally (or tilted to either side) with respect to the chest support brackets 190, 192 thus providing virtually an unlimited range of adjustment to fit the particular needs of the users.

From FIGS. 1 and 2, it will be appreciated that with the chest support brackets 190 and 192 in place, the slots or grooves 197 provide a mounting slot for a plate-like extension 214 having a chin pad 216 secured thereto. The extension 214 may be inserted fully within the space created by the chest support brackets 190, 192 so that the chin pad 216 lies essentially adjacent and forward of the chest support pad or cushion 210, as best seen in FIG. 1. Velcro TM -type strips 215 provide controlled resistance to movement of the extension 214, thus providing controlled infinite height adjustability.

TRAY SUBASSEMBLY

Figure 17:
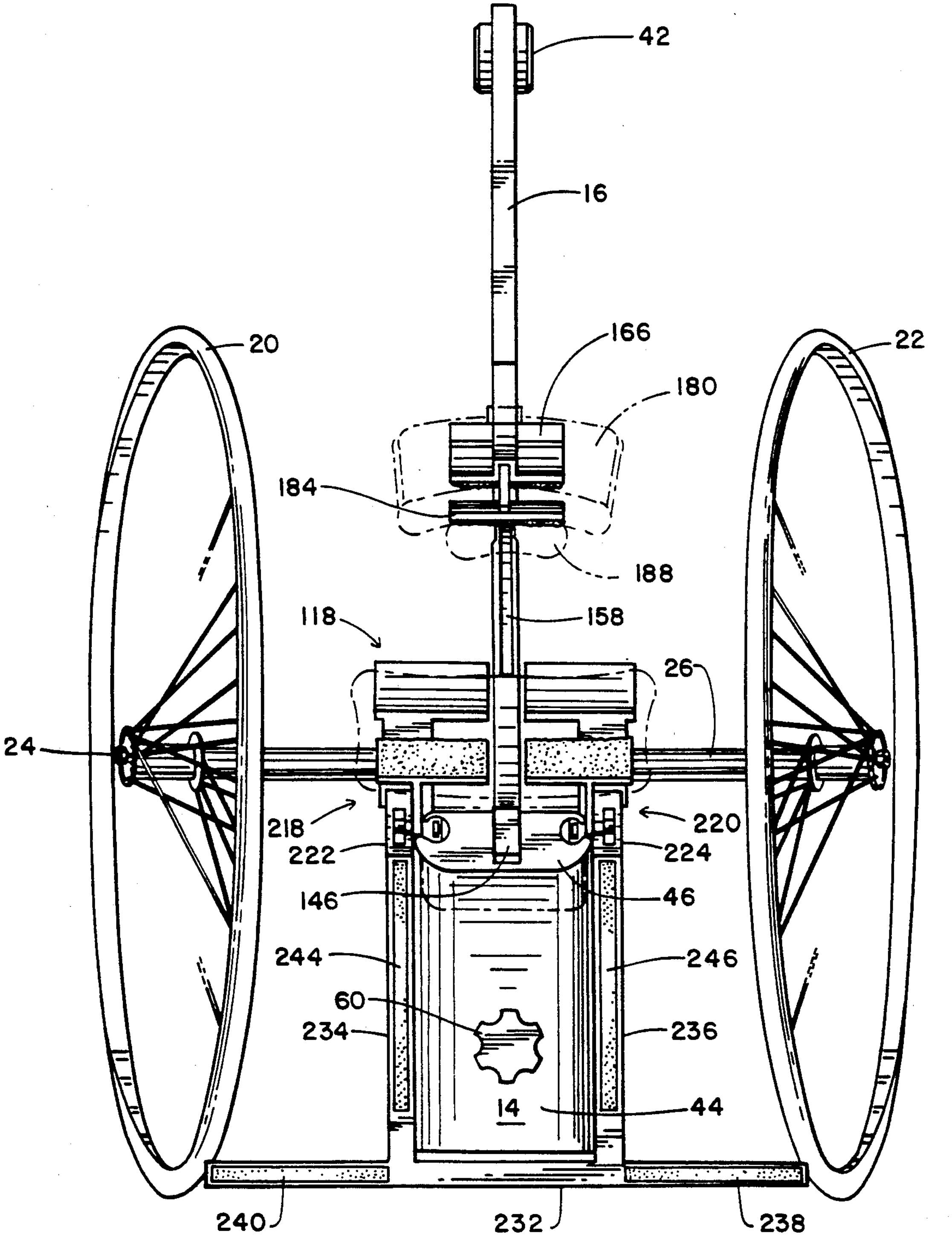
FIG. 17 is a top plan view of the prone stander unit with various components removed for the sake of clarity.

The tray subassembly brackets 218, 220 are slidably secured within the side channels 48, 50 of the upstanding section 46 of the center support 16 in the same manner as chest support brackets 190, 192, so that this aspect of the tray support brackets need not be described further. However, each of the tray support brackets 218, 220 are provided with forward extensions 222, 224, respectively (see FIGS. 2, 3 and 17), each of which is of tubular construction thereby forming elongated closed periphery slots 226, 228 by which a tray may be mounted to the center support as described below.

A tray support 230 is provided which includes a forward transverse member 232 and a pair of laterally spaced members 234, 236 which extend rearwardly of the forward member 232. The rearward portions of members 234, 236 are inclined downwardly and are receivable within the slots 226, 228. As in the case of the L-shaped channel bracket 160, the tray support 230 is self-locking within the slots 226, 228 upon exertion of any downward force on the tray support (or tray) which tend to frictionally lock the downward extensions of the tray support within the slots.

Members 232, 234, and 236 have substantially coplanar tray supporting surfaces, each of which is covered with a hook and loop type fastener material, such as Velcro TM , in strip form, as shown at 238, 240, 242.

The tray element itself, as shown at 246 (preferably transparent, hard plastic) has complementary fastener material strips 248, 250 and 252 which enable the tray 246 to be firmly secured to the tray support 230. It will further be appreciated that the tray may be moved forwardly, rearwardly, or laterally (or angularly) with respect to the tray support 232, while, nevertheless remain secured to the support 230 by the complementary fastener strips.

It will further be appreciated that during the assembly of the mobile stander, the tray support bracket 218, 220 will be secured within channels 48, 50 of upstanding section 46 of the center support 16 before the chest support bracket 190 and 192 are mounted in the same side channels.

On either side of the tray 246, and at the rearward end thereof, there are formed two relatively large circular apertures 254 and 256. Each aperture is designed to receive an adjustable elbow support 258, 260. Since these elbow supports are identical, only 1 need be described in detail.

Figure 18:
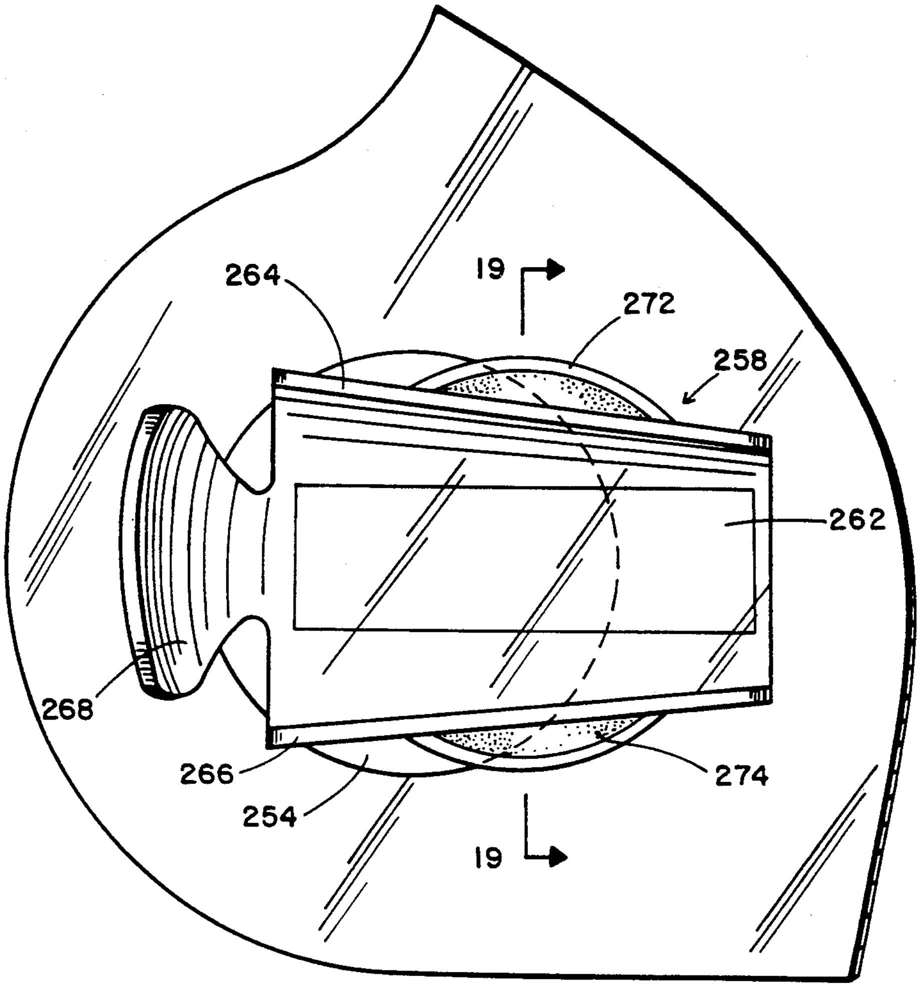
FIG. 18 is a partial plan view of the tray subassembly in accordance with the invention.
Figure 19:
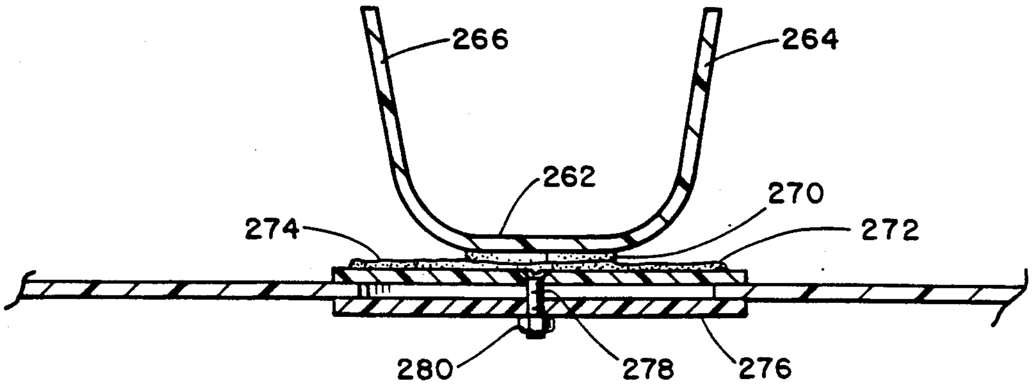
FIG. 19 is a cross section taken along line 19—19 of FIG. 18.

With reference not only to FIG. 2, but especially to FIGS. 18 and 19, the elbow support 258 is a one piece rigid plastic construction which includes a base portion 262 and substantially vertical side extension 264, 266 extending from the base portion 262, to establish a substantially U-shape. A rearward arm supporting portion 268 extends from the base 262 at a rearward angle such that the portion 268 is separated from the side wall extensions 264, 266, as best seen in FIG. 18.

The support 258 is secured by means of hook and loop type fastening material 270, such as Velcro TM to a circular disk 272, the upper surface of which is also covered with complementary fastening material 274. The disk 272 is secured to a similar disk 276 below the tray 246 by, for example, a screw type fastener 278 and nut 280. Since the disks 272 and 276 are each larger than the aperture 254 in the tray 246, the disks are free to move radially (i.e., in any horizontal direction) relative to the aperture 254, limited only by engagement of the fastener 278 with the peripheral wall of the aperture 254.

The above-described degree of adjustability of the disk pair 272, 276, is coupled with the universal adjustability of the elbow support 258 relative to the disk 272. In other words, the support 258 may be moved forward, backward, or sideways (or at any angle) relative to the disk 272, and this entire assembly may be universally moved by reason of the disk pair 272, 276 mounting relative to the aperture 254. Thus, once the proper lateral spacing and back/forward adjustments have been made to suit the particular user, the user may then move his arms universally about the tray confined only by the diameter of the apertures 254, 256 and their respective interaction with fasteners 278. By tightening or loosening the nut 280, the ease with which support 258 may be varied and even locked if desired.

MISCELLANEOUS

A pouch or bag 282 for carrying the user's personal belongings or other contents may be attached to the prone stander 10 by means of a bracket 284 which may be attached to the upstanding section 46 of the center support 16 by simply inserting the down-turned portion 286 of the bracket 284 within the groove 52.

The above-described mobile stander provides unprecedented adjustability and flexibility to suit the particular needs of individual users. It will further be appreciated that where appropriate, any of the above described supports may be removed and, in addition, the tray 246 and associated elbow supports 258, 260, may be used or omitted as required.

The entire mobile stander is easy to assemble and disassemble and adjustment of the various components to suit the user are quickly accomplished as described above.

The particular materials mentioned above as preferred are not meant to be limiting, and it will be understood by those skilled in art that other suitable materials, both metal and plastic may be utilized without negatively impacting on the various characteristics of the mobile stander. It will also be appreciated by those of ordinary skill in the art that minor modifications to any or all of the above-described components may be made without departing from the spirit and scope of the invention as defined by the claims which follow.

What is claimed is:

1. A prone stander frame assembly comprising: a main frame subassembly including:

a) a generally L-shaped center support having a forwardly extending substantially horizontal section and an upstanding section;
b) a rear extension member pivotally secured to said forwardly extending substantially horizontal section of said generally L-shaped center support and extending rearwardly thereof;
c) a main wheel assembly including a pair of relatively large diameter wheels secured to said upstanding section on either side thereof; and
d) relatively small diameter support wheels mounted in axially aligned relationship on said rear extension member forwardly and rearwardly of said main wheel assembly.

2. The prone stander frame assembly of claim 1 wherein said relatively large diameter wheels are mounted on an axle located rearwardly of a pivot pin by which said rear extension member is pivotally secured to said forwardly extending substantially horizontal section.

3. The prone stander frame assembly of claim 2 and including spring loaded adjustment means for adjusting the L-shaped frame member relative to the rear extension member about said pivot pin.

4. The prone stander frame assembly of claim 3 wherein said adjustment means is located at a forward end of said forwardly extending substantially horizontal section.

5. The prone stander frame assembly of claim 1 wherein said relatively larger diameter wheels are canted relative to a vertical plane extending along a longitudinal axis of the main frame assembly.

6. The prone stander frame assembly of claim 1 wherein means are provided on said generally L-shaped center support for supporting a person in a substantially upright orientation.

7. The prone stander frame assembly of claim 6 wherein said supporting means are mounted on said upstanding section of said generally L-shaped center support.

8. The prone stander frame assembly of claim 1 wherein a foot and knee support subassembly is adjustably connected to said upstanding section.

9. The prone stander frame assembly of claim 1 wherein a pelvic, back and head support subassembly is adjustably connected to said upstanding section.

10. The prone stander frame assembly of claim 1 wherein a tray support subassembly is adjustably connected to said upstanding section.

11. A prone stander comprising:

a main frame assembly;

a pair of main, laterally aligned wheels and at least a third support wheel mounted to said frame assembly; and a plurality of support elements for supporting a person on said main frame assembly in a substantially upright orientation, said plurality of support elements including a pair of foot support pads each of which is pivotally secured to a support member adjustably mounted on said main frame assembly, each foot support pad having separately adjustable toe and heel supports removably secured thereto.

12. The prone stander according to claim 11 wherein each foot support pad has an upper surface having a hook and loop fastener material thereon, and each of said toe and heel supports have lower surfaces with complementary hook and loop fastener material thereon.

13. The prone stander, according to claim 11 wherein each said foot pad is pivotally secured to one of a link arm, the other end of said link arm being slidably secured to said support member.

14. The prone stander according to claim 13 wherein said main frame assembly includes a substantially L-shaped center support having a channel along a side edge thereof extending along at least a curved portion of said L-shaped center support, wherein an upper end of said support member is provided with a portion slidable in said channel.

15. The prone stander according to claim 14 wherein said other end of said link arm is lockable in a groove in said support member at selected positions therealong, said foot plate being fixed against any pivoting action when said other end of said link arm is locked within said support member groove.

16. A prone stander comprising:

a main frame assembly;

a pair of main, laterally aligned wheels and at least a third support wheel mounted to said frame assembly; and a plurality of support elements for supporting a person on said main frame assembly in a substantially upright orientation, said plurality of support elements including a pair of knee supports secured to said main frame assembly, each said knee support comprising a right angle bracket having two perpendicularly oriented plates, interior surfaces of said perpendicularly oriented plates provided with hook and loop fastener material, and a substantially kidney-shaped pad having complementary hook and loop fastener material on a back side of said pad, such that said pad is adjustably securable to said plates.

17. The prone stander according to claim 16 wherein said main frame assembly includes a substantially L-shaped center support having a channel along a side edge thereof extending along at least a curved portion of said L-shaped center support, said right angle bracket being fixed to a support member having a portion slidable in said channel.

18. The prone stander according to claim 17 wherein said support member also adjustably mounts a foot support pad.

19. The prone stander according to claim 18 wherein each foot support pad has an upper surface having a hook and loop fastener material thereon, and each of said toe and heel supports have lower surfaces with complementary hook and loop fastener material thereon.

20. A prone stander comprising:

a main frame assembly including an upstanding section;

a pair of main, laterally aligned wheels and at least a third support wheel mounted to said frame assembly along a longitudinal axis of the main frame assembly; and a plurality of support elements for supporting a person on said main frame assembly in a substantially upright orientation, said plurality of support elements including a pelvic support assembly slidably mounted on a said upstanding section of said main frame assembly, said pelvic support assembly projecting rearwardly of said upstanding section and including an L-shaped channel bracket mounted for movement toward and away from said upstanding section.

21. The prone stander of claim 20 wherein said L-shaped channel bracket adjustably supports a backrest and a head rest.

22. A prone stander comprising:

a main frame assembly;

a pair of main, laterally aligned wheels and at least a third support wheel mounted to said frame assembly; and a plurality of support elements for supporting a person on said main frame assembly in a substantially upright position, said plurality of support elements including a tray assembly adjustable and removably secured to said main frame assembly, said tray assembly including a substantially planar tray element and a pair of adjustable forearm and elbow support elements adjustably secured thereto.

23. The prone stander according to claim 22 wherein said planar tray element is provided with a pair of circular apertures, said forearm and elbow support elements being fixed within respective ones of said apertures.

24. The prone stander according to claim 23 wherein each forearm and elbow support includes a pair of vertically spaced discs secured to each other by a pin extending through one of said apertures, each of said discs having diameters greater than that of said apertures, such that said discs engage upper and lower surfaces of said tray element.

25. A tray assembly for a prone stander, said tray assembly comprising:

a supporting frame adjusted for mounting on the prone stander, said supporting frame having first fastener elements thereon;

a substantially planar tray element having upper and lower surfaces, the lower surface having second fastener elements thereon which are complementary to said first fastener elements for mounting the tray element to the supporting frame in a substantially horizontal orientation; and a pair of forearm and elbow supports adjustably secured to said tray element for movement in any horizontal direction within the plane of said tray element.

26. The tray assembly of claim 25 wherein said planar tray element is provided with a pair of circular apertures, said forearm and elbow support elements being fixed within respective ones of said apertures.

27. The prone stander according to claim 26 wherein each forearm and elbow support includes a pair of vertically spaced discs secured to each other by a pin extending through one of said apertures, each of said discs having diameters greater than that of said apertures, such that said discs engage upper and lower surfaces of said tray element.

* * * * *